July 16, 1935.  F. L. MOSELEY  2,008,364
REMOTE CONTROL OF HEAVY OBJECTS
Filed Sept. 12, 1933

INVENTOR
FRANCIS L. MOSELEY
BY
Herbert H. Thompson
HIS ATTORNEY.

Patented July 16, 1935

2,008,364

UNITED STATES PATENT OFFICE 2,008,364

REMOTE CONTROL OF HEAVY OBJECTS

Francis L. Moseley, Brooklyn, N. Y., assignor to Sperry Gyroscope Company, Inc., Brooklyn, N. Y., a corporation of New York Application September 12, 1933, Serial No. 689,075

8 Claims. (Cl. 172—239)

This invention relates to improvements in remote control of movable objects and to follow-up systems and more especially to efficient means for controlling electric motors of considerable power from a distance by means of a low power controller, usually including three element electron tubes, such as grid glow tubes (grid controlled gas filled rectifier tubes) and vacuum tubes. I am aware that attempts have been made to use such tubes for supplying current to reversible power motors, but such systems are necessarily limited in the size of the motor which may be employed by the current carrying capacity of the tubes which is usually comparatively small.

According to my invention I propose to use the tubes only as a control element and not for supplying current to the motor. For this purpose I propose to employ an A. C. repulsion type motor and to use the thermionic tubes and associated transformers as a means for short circuiting selective pairs of brushes on said motor, thereby controlling the motor's speed, torque and direction.

Referring to the drawing showing several forms of my invention may assume;

Figure 1:
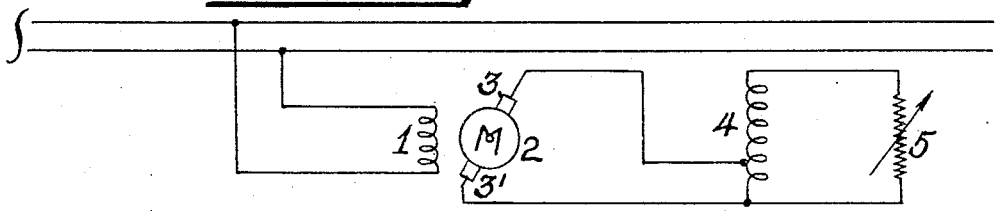
Fig. 1 is a wiring diagram illustrating a simple form my invention may assume and the underlying principle of operation.

In explanation of the theory of operation of this invention, reference will first be had to Fig. 1 showing a repulsion motor M having its field 1 excited from an alternating current supply, and its armature 2 fitted with a commutator and brushes 3 and 3' so placed that the motor torque and speed may be controlled by varying the current flowing in a circuit linking the brushes together. In this figure the brush circuit is completed through the smaller portion of the winding of an auto-transformer 4, the apparent secondary impedance of which is controllable by means of a variable resistor 5 placed across its terminals. The auto-transformer acts as an impedance changing device reflecting the relatively high impedance across its secondary to its primary where it appears as a low impedance effectively short circuiting the motor brushes. Hence, variations in the resistor 5 will control the amount of power delivered by the motor.

Figure 2:
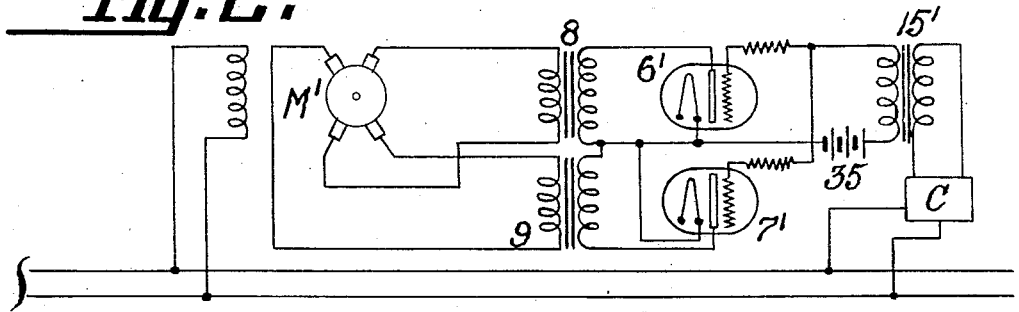
Fig. 2 shows a form of my invention using electron tubes.

This principle is extended in Fig. 2 to the reversible control of a repulsion motor by means of electron tubes. The repulsion motor M', therefore, is provided with two pair of brushes at opposite acute angles to the dead point so that it may be driven in either direction. The control of the motor in this instance is effected from the electron tubes 6' and 7', which are preferably of the grid glow type, through transformers 8 and 9 which serve to reflect the tube impedance to the brush circuit, the tubes acting somewhat as variable resistances across the secondaries of the transformer as does resistor 5 in Fig. 1. On account of the high fixed resistance of the tubes, they are preferably connected to the high voltage side of the transformers, while the brushes are connected to the low voltage side thus effecting a possible very low impedance circuit controllable by the grid glow tubes. Secondarily, the tubes act as rectifiers, thereby causing direct current to flow in the secondaries of said transformers, which fact may be used to saturate the transformer cores and thus further reduce the impedance of the primaries of the transformers as the current through the tube circuit rises. It will be understood that the grids of the tubes may be controlled in any suitable manner by the weak signals from a low power, low torque controller, indicated generall at C. In this instance the weak A. C. signal of reversible phase position from controller C is stepped up in transformer 15' and the grid circuits of the two tubes are connected in parallel to said transformer, while the plates of said tubes are connected in opposition or push-pull fashion to the transformers 8 and 9. Also a source of direct current 35 may be inserted to bias the tubes to prevent starting until the grid swings to a predetermined potential. In this system the tubes are either full on or entirely off, giving a sensitive, although unstable control, unless additional non-hunting means are employed.

Figure 3:
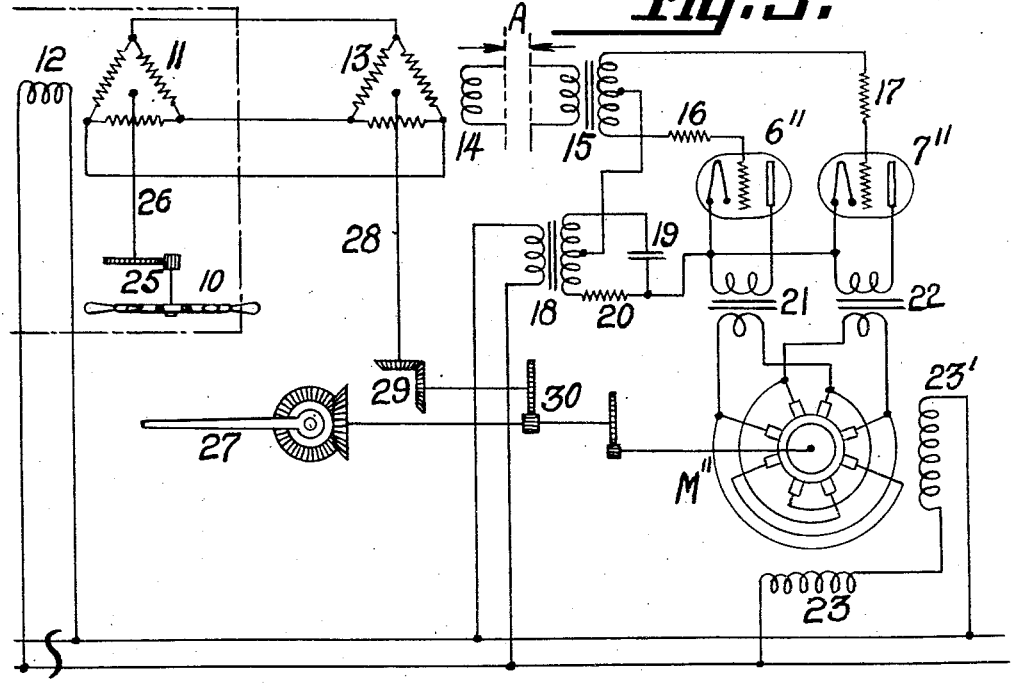
Fig. 3 shows still a further development of my invention as applied to a system of transmitting angular motion, such as might be employed for turning a ship's rudder from the pilot house controller or a searchlight from a binocular or sound locator.

Fig. 3 shows how my invention may be employed in connection with a self-synchronous repeater system for the control of a ship's rudder, for instance. The pilot wheel is shown at 10, which is connected through gearing 25 to the shaft 26 of a rotatable element of a self-synchronous A. C. inductive generator 11, the single phase field 12 being supplied with current from the alternating current supply. The rotor is shown as having three taps in circuit with a similar inductive device having a rotor 13 geared to rotate with the rudder 27 through shaft 26 and gearing 29 and 30. When shafts 26 and 28 are in angular agreement, field winding 14 stands at right angles to the field produced in 13, so that no E. M. F. is generated in the field winding 14, but upon slight displacement between said positions an A. C. voltage will be generated in winding 14 which varies in magnitude and direction (i. e. 180° phase displacement) in accordance with the extent and direction of the displacement. This signal voltage may be amplified by any suitable means (not shown) and represented by space A, either before or after being applied to the dividing transformer 15 by means of which opposite phases are applied to the grids of a pair of electron tubes 6'' and 7'' through resistances 16 and 17 in such a manner that the phases on the grids of the two tubes are oppositely shifted in accordance with the magnitude and direction of the signal, giving a more graduated, smoother control than the grid control of Fig. 2. For this purpose I prefer to employ the system of dynamic phase shift described and claimed in my prior application for Letters Patent, Serial No. 679,589, filed July 8, 1933 for Phase shift control for electron tubes in which a bias voltage is added to the signal voltage to produce a phase shift on the grid. For this purpose a phase shift net work consisting of transformer 18, having a center tap leading to the center tap of the transformer 15, is employed, the primary being excited directly from the supply and a bias voltage being produced by a condenser 19 and resistance 20 circuit connected to the cathodes of the tubes. The heater winding circuit of all tubes is omitted for the sake of clearness.

The outputs of said tubes are connected across the high voltage secondaries of transformers 21, 22 which serve to control the short circuiting of the two sets of brushes on the repulsion type motor M'' in a manner similar to that hereinbefore described, the motor in this instance being shown with two field windings 23, 23' excited from the supply. It will be quite apparent, therefore, that my system of motor control differs from the systems heretofore proposed in that the electron tubes, according to my invention, are used only to vary the operating characteristics of the power motor and not as a means for supplying, controlling or rectifying the current or power supplied to the motor.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A remote control for moving heavy objects from small signal currents comprising a repulsion motor having its field excited from an A. C. supply, a transformer having its low voltage side connected across its brushes, an electron tube having its output connected to the high voltage side of said transformer, a controller powered from said supply for supplying weak signal impulses of variable magnitude and direction, and means for causing said signals to shift the phase on the grid of said tube.

2. Means for rotating an object requiring a comparatively large torque from a controller of small torque comprising a repulsion motor for the driven object having its field excited from an A. C. supply, means including an electron tube for governing the amount of current flowing between the brushes of said motor by varying the effective impedance therebetween, and means responsive to relative angular movements of said controller and driven object for controlling the grid of said tube to vary its resistance.

3. Means for rotating an object requiring a comparatively large torque from a controller of small torque comprising a repulsion motor for the driven object having its field excited from an A. C. supply and two sets of reversing brushes, means including electron tubes and transformers for governing the amount of current flowing between the different pairs of brushes of said motor by varying the effective impedance therebetween, and means responsive to relative angular movements of said controller and driven object for oppositely controlling the grids of said tubes to vary their resistance.

4. Means for rotating an object requiring a comparatively large torque from a controller of small torque comprising a repulsion motor for the driven object having its field excited from an A. C. supply and two sets of reversing brushes, means including electron tubes and transformers for governing the amount of current flowing between the different pairs of brushes of said motor by varying the effective impedance therebetween, means responsive to relative angular movements of said controller and driven object for transmitting weak signals which vary in direction and magnitude according to the direction and magnitude of said displacement, and means controlled thereby for oppositely shifting the phases on the grids of said tubes for the purpose specified.

5. A remote control for moving heavy objects from small signal current comprising a repulsion motor having its field excited from an A. C. supply, a transformer having its low voltage side connected across its brushes, an electron tube having its output circuit across the other side of said transformer so as to act as a variable resistance, and a controller for supplying signals on the grid of said tube for controlling the speed of said motor.

6. Means for rotating an object requiring a comparatively large torque from a controller of small torque comprising a repulsion motor for the driven object having its field excited from an A. C. supply and two sets of reversing brushes, means including electron tubes and transformers for governing the amount of current flowing between the different pairs of brushes of said motor by varying the effective impedance therebetween, means responsive to relative angular movements of said controller and driven object for transmitting weak signals which vary in direction and magnitude according to the direction and magnitude of said displacement, and means controlled thereby for oppositely controlling the output of said tubes to oppositely vary the impedances across the two pair of brushes upon such relative angular movement.

7. A remote control for moving heavy objects from small signal currents comprising a repulsion motor having its field excited from an A. C. supply, a transformer having its low voltage side connected across its brushes, an electron tube having its output connected to the high voltage side of said transformer, a controller powered from said supply for supplying weak signal impulses of variable magnitude and direction, and means for causing said signals to vary the impedance of said tube.

8. A remote control for moving heavy objects in either direction from small signal current comprising a repulsion motor having its field excited from an A. C. supply, a pair of transformers having their low voltage side connected across pairs of brushes, a pair of electron tubes having their output circuits across the other sides of said transformers so as to act as a variable resistance, and a controller for supplying oppositely variable signals on the grids of said tubes for controlling the speed and direction of said motor.

FRANCIS L. MOSELEY.